United States Patent [19]
Blumenthal et al.

[11] Patent Number: 5,750,605
[45] Date of Patent: May 12, 1998

[54] HOT MELT ADHESIVES BASED ON SULFONATED POLYESTERS

[75] Inventors: Mitchell J. Blumenthal, Belle Mead; Matthew L. Sharak, Franklin Park; Charles W. Paul, Madison, all of N.J.

[73] Assignee: National Starch and Chemical Investment Holding Corporation, Wilmington, Del.

[21] Appl. No.: 652,072

[22] Filed: May 23, 1996

Related U.S. Application Data

[63] Continuation of Ser. No. 522,190, Aug. 31, 1995, abandoned.

[51] Int. Cl.$^6$ .............. C08K 5/20; C08K 5/01; C08L 93/04; C08J 167/00
[52] U.S. Cl. .......... 524/230; 524/221; 524/227; 524/272; 524/277; 524/310; 524/488; 524/603; 524/606; 524/609; 524/57
[58] Field of Search ............. 524/57, 221, 227, 524/230, 231, 270, 272, 277, 310, 603, 606, 609, 499; 525/58, 92 F, 67, 408, 411, 425, 437, 444, 445, 447; 528/272, 291, 295, 297, 361

[56] References Cited

U.S. PATENT DOCUMENTS

| | | | |
|---|---|---|---|
| 3,779,993 | 12/1973 | Kibler et al. | 528/295 |
| 4,052,368 | 10/1977 | Larson | 528/293 |
| 4,073,777 | 2/1978 | O'Neill et al. | 528/295 |
| 4,233,196 | 11/1980 | Sublett | 524/602 |
| 4,257,928 | 3/1981 | Vachon et al. | 528/295 |
| 4,304,901 | 12/1981 | O'Neill et al. | 528/290 |
| 4,525,524 | 6/1985 | Tung et al. | 524/601 |
| 4,598,142 | 7/1986 | Hilbert et al. | 528/295 |
| 4,735,843 | 4/1988 | Noda et al. | 428/137 |
| 4,910,292 | 3/1990 | Blount | 528/272 |
| 4,973,656 | 11/1990 | Blount | 528/272 |
| 4,990,593 | 2/1991 | Blount | 528/272 |
| 5,098,962 | 3/1992 | Bozich | 525/437 |
| 5,356,963 | 10/1994 | Kauffman et al. | 524/43 |
| 5,360,845 | 11/1994 | Billmers et al. | 524/51 |
| 5,382,652 | 1/1995 | Fukuda et al. | 528/308.6 |
| 5,387,623 | 2/1995 | Ryan et al. | 523/124 |
| 5,532,306 | 7/1996 | Kauffman et al. | 524/274 |
| 5,543,488 | 8/1996 | Miller et al. | 528/277 |
| 5,552,495 | 9/1996 | Miller et al. | 525/437 |
| 5,574,076 | 11/1996 | Sharak et al. | 524/292 |

FOREIGN PATENT DOCUMENTS

| | | | |
|---|---|---|---|
| WO 95/18191 | 12/1994 | WIPO | C09J 167/00 |
| WO 9607540 | 1/1995 | WIPO | . |
| WO 95/05413 | 12/1995 | WIPO | C08G 63/688 |

OTHER PUBLICATIONS

Eastman Chemical, "Eastman AQ® Polymers Properties and Applications", Aug. 1989.

*Primary Examiner*—Peter A. Szekely
*Attorney, Agent, or Firm*—Ellen T. Dec

[57] ABSTRACT

A hot melt adhesive composition comprising (i) 10 to 90% by weight of a sulfonated polyester condensation polymer;
(ii) 0 to 80% by weight of a compatible tackifier;
(iii) 0 to 40% by weight of a compatible plasticizer;
(iv) 5 to 40% by weight of a compatible wax diluent with a molecular weight below 500 g/mole containing at least one polar functional group, said group being present at a concentration greater than $3\times10^{-3}$ equivalents per gram;
(v) 0 to 60% by weight of a compatible crystalline thermoplastic polymer; and
(vi) 0 to 3% by weight of a stabilizer, the total of (i)–(vi) to equal 100% by weight.

28 Claims, No Drawings

HOT MELT ADHESIVES BASED ON SULFONATED POLYESTERS

BACKGROUND OF THE INVENTION

This is a continuation in part of application Ser. No. 08/522/190, filed Aug. 31, 1995, now abandoned.

Hot melt adhesives are used commercially for a wide variety of applications. The major advantage of hot melt adhesive systems is the lack of a carrier fluid which eliminates the need for drying the adhesive film once it is applied to the substrate. This elimination of the drying step overcomes hazards associated with solvent usage and also allows for faster production line speeds and lower transportation costs.

For various applications, it is also desired that some hot melt adhesives be hydrophilic, i.e., be water-soluble, water-sensitive or water-activated. Such hydrophilic adhesives find use, for example, in the construction of flushable disposable products including diapers and sanitary napkins where the high degree of tack which is needed during construction and use must be substantially decreased so as to prevent adhesion to porcelain and sewer pipes, and also to promote the disintegration of the disposable article in water. Water activatible adhesives are used for remoistenable envelope seals and other labeling applications where subsequent repulpability is also beneficial. Water repulpable adhesives are particularly useful in applications involving bag sealing, case and carton sealing, bookbinding, roll wrapping and tissue plybonding.

Hot melt adhesives have historically been based on petroleum derived polymers such as polyethylene, ethylene-vinyl acetate, styrenic block copolymers and polypropylene. Water sensitive hot melts have also been prepared from vinyl pyrrolidone polymers including vinyl acetate/vinyl pyrrolidone copolymers. All these adhesive compositions are further tackified, plasticized and/or reinforced with a variety of resins, oils and/or waxes which are derived from both petroleum and naturally occurring feedstocks such as wood, gum and tall oil rosin and terpenes. These classic compositions suffer from the cyclical price cycles common to all oil derived materials and also are generally very resistant to degradation once the articles employing them are disposed of.

The present invention stems from the growing need for hydrophilic materials and also the movement to utilize raw materials which have demonstrated some level of degradation. In this regard, water dispersible sulfonated polyesters have been available for many years. When used in hot melt adhesives, the resulted adhesives were generally of very high viscosity because of several reasons: 1) the incompatibility of the polymers with common waxes; 2) the high Tg of the polymers used due to the aromaticity of the diacids which were generally used in such polyesters; and 3) the high molecular weight of the polymers. Recently, improved sulfonated polyesters were developed (Miller et. al., WO 95/18191) which are characterized by reduced Tg's of less than 20° C. and by the incorporation of branch points to raise the strength/viscosity ratio. Nonetheless, these adhesive compositions described by Miller et. al. are still not suitable for most packaging application because of their poor heat resistance and high viscosity. While it is possible that such deficiencies could be overcome by the addition of waxes, the waxes normally used in these types of adhesives, even those relatively high polarity are not compatible except at very low concentrations, (i.e., <5%).

SUMMARY OF THE INVENTION

We have now found that the heat resistance and strength of hot melt adhesives based on sulfonated polyesters may be significantly improved by the incorporation of specific crystalline waxes or polymers. By use of the term "crystalline" herein is meant that the material exhibits one or more melting exotherms when subjected to DSC (Differential Scanning Colorimetry) testing. Thus, we have discovered that crystalline waxes compatible to the required level to obtain good adhesive properties ($\geq$10% wax) must contain at least one polar functional groups (e.g., hydroxyl, amide, sulfone, phosphate, sulfonamide, urethane, carboxylate acid, amine, carbonate) and that those must be present at a concentration of greater than $3\times10^{-3}$ equivalents per gram. In addition the wax molecular weight must be below 500 g/mole. Alternatively, the desired properties may be achieved by the incorporation of 5 to 60% by weight of certain hydrophobic crystalline thermoplastic polymers such as ethylene vinyl acetate copolymers containing about 12 to 50% vinyl acetate, ethylene acrylic acid, ethylene methyl acrylate and ethylene n-butyl acrylate copolymers as well as polylactide, caprolactone polymers and poly(hydroxybutyrate/hydroxyvalerate), polyvinyl alcohol, poly (ethylene oxide) linear saturated polyesters such as Dynapol or Dynacoll polymers from Hüls, polyether amide or polyester ether block copolymers available from Atochem (Pebax) or Hoechst Celanese (Riteflex) respectively, and polyamide polymers such as those available from Union Camp (Unirez) or Hulls (Vestamelt) or EMS-Chemle (Griltex).

The crystalline wax materials are necessary to obtain fast set speeds and the very low viscosity required for most packaging applications (<3000 cps at the application temperature). For other applications requiring either high strength (such as bookbinding, bag ending, binder fibers, or films) or moderate strength but high flexibility (construction adhesives used to bond flexible substrates such as thin films and nonwovens) the addition of the crystalline polymers is necessary to obtain the right balance of flexibility, strength, and toughness, as well as to prevent cold flow.

Thus, in its broadest aspect, the present invention is directed to hot melt adhesive compositions comprising (a) 10 to 90% by weight of a sulfonated polyester; (b) 0 to 80% by weight of a compatible tackifier; (c) 0 to 40% by weight of a compatible plasticizer and 0 to 3% by weight of a stabilizer; (d) 5% by weight of at least one crystalline material selected from the group consisting of a compatible crystalline wax diluent and a crystalline thermoplastic polymer with the total of (a)–(d) to equal 100% by weight.

it will be recognized that the general formulations described above can be adapted to include a wide variety of hot melt adhesive compositions, the more precise formulations of which will vary depending upon the specific end use, as known to those skilled in the particular art.

Preferred packaging adhesives are non-pressure sensitive and are prepared using 30 to 70% of the polyester, 5 to 30% of a polar tackifier; 0 to 40% of a plasticizer, preferably a diethylene glycol benzoate or other liquid polyester oligomer; and 10 to 30% of the crystalline wax, preferably stearamide, or N-(2-hydroxyethyl)-12-hydroxy stearamide. Other preferred non-pressure sensitive adhesives are prepared using 0 to 30% of a polar tackifier; 0 to 40% of a plasticizer, preferably a diethylene glycol benzoate or other liquid polyester oligomer; and 10 to 30% of the crystalline wax, preferably stearamide, or N-(2-hydroxyethyl)-12-hydroxy stearamide; and 5 to 60% of a polyester.

DETAILED DESCRIPTION OF THE INVENTION

The major component of the adhesive of the invention, present in an amount of 10 to 90% by weight of the adhesive comprises a sulfonated polyester condensation polymer comprising the reaction product of:

a) at least one difunctional dicarboxylic acid or corresponding methyl ester which is not a sulphomonomer;

b) 2 to 25 mole percent of at least one sulphomonomer containing at least one metallic sulfonate group or nitrogen-containing non-metallic sulfonate group attached to an aromatic or cycloaliphatic nucleus and at least one functional group selected from the group consisting of hydroxyl, carboxyl, and amino;

c) at least one difunctional reactant selected from a glycol or a mixture of a glycol and diamine having two —NRH groups, the glycol containing two —C(R$^1$)$_2$—OH groups wherein R in the reactant is hydrogen or an alkyl group of 1 to 6 carbon atoms, and R$^1$ in the reactant is a hydrogen atom, an alkyl of 1 to 5 carbon atoms, or an aryl group of 6 to 10 carbons atoms;

d) 0 to 40 mole percent of a difunctional reactant selected from hydroxycarboxylic acids having one —C(R)$_2$—OH group, aminocarboxylic acids having one —NRH group, amino-alcohols having one —C(R)$_2$—OH group and one —NRH group, or mixtures of said difunctional reactants wherein R in the reactant is hydrogen or an alkyl group of 1 to 6 carbon atoms; and e) 0 to 40 mole percent of a multifunctional reactant containing at least three functional groups selected from hydroxyl, carboxyl, and mixtures thereof wherein at least a portion of the multifunctional reactant contains at least three hydroxyl groups, wherein all stated mole percentages are based on the total of all acid, hydroxyl and amino group containing reactants being equal to 200 mole percent, and wherein the polymer contains proportions of acid-group containing reactants (100 mole percent acid) to hydroxy- and amino-group containing reactants (100 mole percent base) such that the value of (equivalents) EQ (base) divided by (equivalents) EQ (acid) is between 0.5 and 2.

The difunctional acid or ester reactant of (a) of the composition of the present invention is preferably substantially aliphatic in nature and may be an acid selected from the group consisting of oxalic; malonic; dimethylmalonic; succinic; glutaric; adipic; trimethyladipic; pimelic; pivalic; fumaric; maleic; dodecanoic; 2,2-dimethylglutaric; azelaic; sebacic; 1,3-cyclopentane-dicarboxylic; 1,2-cyclohexanedicarboxylic; 1,3-cyclohexane dicarboxylic; 1,4-cyclo-hexanedicarboxylic; phthalic; terephthalic; isophthalic; 2,5-norbornane-dicarboxylic; 1,3-naphthalic; diphenic; 4,4'-oxydibenzoic; diglycolic; thiodiproplonic; 4,4'-sulfonyldibenzoic; and 2,5-naphthalenedicarboxylic acids and esters thereof and mixtures thereof. The difunctional dicarboxylic acid or ester reactant of (a) is preferably selected from the group of acids consisting of isophthalic acid, terephthalic acid, phthalic anhydride (acid), adipic acid, pivalic acid, dodecanedioic acid, sebacic acid, azelaic acid, 1,4-cyclohexanedicarboxylic acid, 1,3-cyclohexanedicarboxylic acid, maleic anhydride, fumaric acid, succinic anhydride (acid), 2,6-naphthalenedicarboxylic acid, and glutaric acid and esters thereof and mixtures thereof. The more preferred difunctional dicarboxylic acid reactants of (a) are selected from the group consisting of isophthalic acid, adipic acid, 1,4-cyclohexanedicarboxylic acid, 1,3-cyclohexanedicarboxylic acid and mixtures thereof with 1,4-cyclohexanedicarboxylic acid being most preferred.

The sulphomonomer reactant of (b) is preferably selected from the group consisting of difunctional monomers containing a —SO$_3$M group attached to a nucleus selected from the group consisting of benzene, naphthalene, anthracene, diphenyl, oxydiphenyl, sulfonyldiphenyl, and methylenediphenyl, wherein M is Na+, Li+, Mg++, Ca++, Fe++, and Fe+++. The more preferred sulfomonomer reactant of (b) is selected from the group consisting of diols an diol adducts of multifunctional reactant containing at least three hydroxyl groups and a monocarboxylic acid sulfomonomer containing at least one metallic sulfonate group or nitrogen-containing non-metallic sulfonate group attached to an aromatic or cyclo-aliphatic nucleus. Alternatively, a more preferred group of sulfomonomers include 5-sodiosulfoisophthalic acid, dimethyl 5-sodiosulfoisophthalate, 5-lithiosulfoisphthalic acid, and bis(2-hydroxyethyl)-5-sodiosulfoisophthalate; with the 5-sodiosulfolsophthalic acid or dimethyl 5-sodiosulfoisophthalate being most preferred.

The difunctional reactant of (c) is preferably a diol selected from the group consisting of ethylene glycol; propylene glycol, 1,3-propanediol, 2-methyl-1,3-propanediol, 2,4-dimethyl-2-ethyl-hexane-1,3-diol, 2,2-dimethyl-1,3-propanediol(neopentylglycol),2-ethyl-2-butyl-1,3-propanediol(neopentylglycol),2-ethyl-2-butyl-1,3-propanediol, 2-ethyl-2-isobutyl-1,3-propanediol, 1,3-butanediol, 1,4-butanediol, 1,5-pentanediol, 1,6-hexanediol, 2,2,4-trimethyl-1,6-hexanediol, thiodiethanol, 1,2-cyclohexanedimethanol, 1,3-cyclohexanedimethanol, 1,4-cyclohexanedimethanol, 2,2,4,4-tetramethyl-1,3-cyclobutanediol, p-xylylenediol,diethylene glycol, triethylene glycol, tetraethylene glycol, pentaethylene glycol, hexaethylene glycol, heptaethylene glycol, octaethylene glycol, nonaethylene glycol, decaethylene glycols, 2,2,4-trimethyl-1-1,3-pentanediol, hydroxypivalyl hydroxypivalate, dipropylene glycol, 1,10-decanediol, hydrogenated bisphenol A, and mixtures thereof. The difunctional reactant of (c) is more preferably selected from the group consisting of diethylene glycol; neopentyl glycol, cyclohexanedimethanol, 2-ethyl-2-butyl-1,3-propanediol, 2,2,4-trimethyl-1,3-pentanediol, hydroxypivalyl hydroxypivalate, and 2-methyl-1,3-propanediol, with diethylene glycol, neopentyl glycol, and cyclohexanedimethanol being most preferred.

Advantageous difunctional components which are aminoalcohols include aromatic, aliphatic, heterocyclic and other types as in regard to component (d). Specific examples include 5-aminomethyl-cyclohexanemethanol; 5-amino-2-ethyl-pentanol-1,2-(4-p-hydroxyethoxyphenyl)-1-aminoethane, 3-amino-2,2-dimethylpropanol, hydroxyethylamine, etc. Generally these aminoalcohols contain from 2 to 20 carbon atoms, one —NRH group and one —C(R)$_2$—OH group.

Advantageous difunctional monomer components which are aminocarboxylic acids include aromatic aliphatic, heterocylic, and other types as in regard to component (d) and include lactams. Specific examples include 6-aminocaproic acid, its lactam known as caprolactam, omega-aminoundecanoic acid, 3-amino-2-dimethylpropionic acid, 4-(β-aminoethyl)-benzoic acid, 2-(β-aminopropoxy) benzoic acid, 4-aminomethlcyclohexanecarboxylic acid, 2-(β-aminopropoxy) cyclohexanecarboxylic acid, etc. Generally these compounds contain from 2 to 20 carbon atoms.

Advantageous examples of difunctional monomer component (d) which are diamines include ethylene-diamine; hexamethyienediamine; 2,2,4-trimethylhexamethylenediamlne; 4-oxaheptane-1,7-diamine; 4,7-dioxadecane-1,10-diamine; 1,4-cyclohexanebismethylamine; 1,3-cycloheptamethylenediamine; dodecamethylenediamine, etc.

Reactant (e), when used, preferably contains 3 to 6 hydroxyl and/or carboxyl groups; more preferred is trimethylolpropane (TMP), trimethylolethane (TME), glycerine, pentaerythritol, arytritol, threitol, dipentaerythritol, sorbitol, trimellitic anhydride, pyromellitic dianhydride, or dimethylolpropionic acid, with TMP being most preferred. It is preferred that reactant (e) be present in a minor amount up to 40 mole percent, more preferred 0 to 20 mole percent.

The polyester composition used as a component of the hot melt adhesives of the present invention preferably comprises 60 to 100 mole percent of (a), 4 to 20 mole percent of (b), 80 to 100 mole percent of (c), 0 to 10 mole percent of (d), and 0 to 20 mole percent of (e).

In other more preferred embodiments of the invention the polyester comprises 60 to 100 mole percent of 1,4-cyclohexanedicarboxylic acid; 4to 20 mole percent of 5-sodiosulfoisophthalic acid or dimethyl 5-sodiosulfoisophthalate; and 80 to 100 mole percent of diethylene glycol, neopentyl glycol or cyclohexanedimethanol.

The use of sulfonated polyester confers the additional advantage of providing a degree of water sensitivity which is dependent on the ionic strength of the aqueous environment. Thus, adhesives can be formulated which are sufficiently resistant to the ionic environments encountered during use (such as the exposure to bodily fluids encountered in diapers and feminine napkins) yet still disperse and/or debond in tap water, which is of lower ionic strength. These adhesives are therefore particularly useful in constructing flushable disposable articles.

The sulfonated polyester component has been found to provide the unique properties to the adhesives of the present invention. The ability to use such levels of this material in adhesives is unexpected in light of the fact that the polymer, by itself, does not possess an adequate balance of heat and cold adhesion as required by specific end use applications. Moreover, the adhesive can be applied at relatively low temperatures, i.e. as low as about 250° F., a definite advantage in many applications involving heat sensitive substrates which may be damaged by coating with molten adhesives at higher temperatures, while providing a greater degree of safety to the handler.

The preparation of the polyesters used herein is generally described, for example, in U.S. Pat. Nos. 4,910,292, 4,973,656, and 4,990,593.

The preferred polycondensation reactant conditions for the preparation of the polyester are at a temperature of 150° to 230° C. In the presence of a catalyst. The catalyst for the polycondensation reaction is preferably an acid catalyst more preferably an organo-metallic compound, such as a tin or titanium containing compound. Suitable examples of the acid catalyst include dibutyltinoxide, stannous oxalate, titaniumtetraisopropoxide, butylstannoic acid, and p-toluenesulfonic acid, with butylstannoic acid being most preferred. A preferred butylstannoic acid catalytic amount is 0 to 0.5 weight percent, based on the total weight of reactants, preferably 0.01 to 0.2 weight percent, with 0.1 weight percent being most preferred.

The viscosity of the polyester is preferably between 1000 cP and 1,000,000 cP at 350° F., most preferably between 5000 and 60,000 cP. Viscosity is measured in a Brookfield viscometer using a #27 spindle. Viscosity is generally related to molecular weight with higher viscosities corresponding to higher molecular weights.

The tackifying resins useful in the adhesive compositions are generally polar in nature and have a Ring and Ball softening point greater than 60° C. and include rosin and rosin derivatives, terpene phenolics, pure phenolic resins, and the like. More particularly, the useful tackifying resins include any compatible resins or mixtures thereof such as (1) natural and modified rosins such, for example, as gum rosin, wood rosin, tall oil rosin, distilled rosin, hydrogenated rosin, dimerized rosin, and polymerized rosin; (2) rosin esters such as glycerol and pentaerythritol esters of natural and modified rosins, such, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin; and (3) phenolic modified (a) terpene or (b) α-methyl styrene resins as well as the hydrogenated derivatives thereof such, for example, as the resin product resulting from the condensation, in an acidic medium of a bicyclic terpene and a phenol. Mixtures of two or more of the above described tackifying resins, as well as blends of the above resins with small amounts of (e.g., less than about 20% of the adhesive) less compatible resins may be utilized for some formulations.

Representative of the latter group of polar tackifiers include ionic materials such as Foral NC available from Hercules; non-ionic materials such as Foral AX also from Hercules; alpha methyl styrene phenolics such as Uratak 68520 from DSM Resins, rosin esters such as Unitac R100L available from Union Camp and terpene phenolics such as Nirez 300, available from Arizona Chemical. In the formulations, typically terpene phenolic tackifiers such as Nirez 300 are generally not water dispersible; however, because the sulfonated polyester is very water sensitive, incorporating the tackifier at low levels (i.e., less than 50%) into the present adhesive formulations does not inhibit the water sensitivity of the adhesives.

Furthermore, the use of sucrose benzoate as a tackifier has been found to be particularly useful due to its biodegradable and compostable character. The sucrose benzoate is preferably utilized in its alcohol soluble form wherein the sucrose is partially esterified. This grade is a light colored, clear non-crystalline solid with a softening point of about 95° C. Alternatively, the non-alcohol organic soluble grade, a water-clear, non-crystalline flake solid having a softening point of 98° C. may also be used. Both grades are available commercially from Velsicol Chemical Corporation.

Additionally, small amounts (i.e., less than 20 percent by weight) of non-polar tackifiers may be used in combination with the previously described tackifiers. Typical of this class of non-polar tackifiers are the aromatic/aliphatics such as ECR-149B from Exxon Chemical; aromatics such as Kristalex 3085 from Hercules; aliphatic hydrocarbons such as Wingtac 95 from Goodyear; cyclic aliphatics such as Eastotac H-100 from Eastman Chemical. While the tackifier may comprise up to about 70% of the adhesive, it is generally used in amounts of about 10 to 60% by weight.

Depending on the end-use application, and particularly for uses requiring highly flexible adhesives, various compatible liquid plasticizers or extending oils are present in the composition. Preferred compatible plasticizers are non-crystalline in nature and include polar liquid plasticizers including phthalate plasticizers such as dioctyl phthalate and butyl benzyl phthalate (e.g., Santicizer 160 from Monsanto); liquid polyesters (non-crystalline) such as Dynacol 720 from Hüls and the liquid polymeric plasticizer available from C. P. Hall; benzoate plasticizers such as 1,4-cyclohexane dimethanol dibenzoate (e.g., Benzoflex 352 available commercially from Velsicol), diethylene glycol/dipropylene glycol dibenzoate (e.g., Benzoflex 50 from Velsicol) and diethylene glycol dibenzoate where the mole fraction of hydroxyl groups which have been esterified ranges from 0.5 to 0.95 (e.g. Benzoflex 2-45 High Hydroxyl also from Velsicol); phosphate plasticizers such as t-butylphenyl diphenyl phosphate (e.g., Santicizer 154 available commercially from Monsanto); poly(ethylene glycol) with molecular weight below about 1000 and derivatives of poly(ethylene glycol) (e.g., Pycal 94, the phenyl ether of PEG, available commercially from ICI); ethoxylated bis phenol A (e.g., Macol 206 EM from PPG industries); dinonyl phenol ethyoxylates (e.g., Surfonic DNP 100 from Huntsman Chemical Corp.); liquid rosin derivatives having Ring and Ball melting points below about 60° C. such as the methyl ester of hydrogenated rosin (eg., Hercolyn D from Hercules); as well as vegetable and animal oils such as glycerol esters of fatty acids and polymerization products thereof. Particularly preferred plasticizer include phenyl ether of polyethylene-glycol; butyl benzyl phthalate; benzoates such as 1,4-cyclohexane dimethanol dibenzoate, diethylene glycol/dipropylene glycol dibenzoate, and diethylene glycol dibenzoate where the mole fraction of hydroxyl groups which have been esterified ranges from 0.5 to 0.95. These plasticizers are also polar in chemical composition and show improved compatibility over plasticizers which are not polar such as mineral oil.

It will be recognized that the end use application will greatly affect the choice of plasticizing diluent with adhesives which require biodegradability using plasticizers such as benzoates, phthalates, liquid polyesters as well as vegetable and animal oils. Applications where water dispersibility is more essential will benefit from the use of polyethylene glycol or water soluble ethoxylated alcohols (e.g. Pycal 94) as the plasticizing component.

There may also be present small amounts (i.e. less than about 10%) of non-polar plasticizing diluents such as mineral oil and polybutene.

Certain of the adhesives of the invention require the use of crystalline wax materials. In such cases, the waxes are employed at levels of 10 to about 40% by weight to reduce the melt viscosity while improving heat resistance. The waxes used must be highly polar, containing $\geq 3 \times 10^{-3}$ equiv/g of polar groups and at least one group per molecule and with a molecular weight below 500 g/mole. Higher concentrations of polar groups are necessary for higher molecular weight waxes. These polar groups include hydroxyl, amide (primary, secondary, and tertiary), sulfone, phosphate esters, sulfonamide, carbonate, urea, amine, urethane, carboxylic acid; and carboxylate salts, ureas, and sulfonate salts.

Suitable crystalline polar waxes include 12-hydroxystearamide, N-(2-hydroxy ethyl) 12-hydroxystearamide (Paricin 220 from CasChem), stearamide (Kemamide S from Witco), glycerin monostearate, sorbitan monostearate, and 12-hydroxy stearic acid. Also useful in combination with the above are the less polar waxes such as N,N'-ethylene-bis-stearamide (Kemamide W-40 from Witco), hydrogenated castor oil (castor wax), oxidized synthetic waxes, and functionalized synthetic waxes such as oxidized polyethylene waxes (Petrolite E-1040).

The crystalline component necessary for the adhesives of the invention may alternatively be a crystalline hydrophobic thermoplastic polymer present in the adhesive 5 to 60%, preferably 10 to 40%. These polymers are employed in order to impart flexibility, toughness and strength. Suitable crystalline thermoplastic polymers include ethylene vinyl acetate copolymers containing about 12 to 50% vinyl acetate, ethylene acrylic acid, ethylene methyl acrylate and ethylene n-butyl acrylate copolymers as well as polylactide, caprolactone polymers and poly(hydroxy-butyrate/hydroxyvalerate), polyvinyl alcohol, linear saturated polyesters such as Dynapol or Dynacoll polymers from Huls, poly (ethylene oxide) polyether amide or polyester ether block copolymers available from Atochem (Pebax) or Hoechst Celanese (Riteflex) respectively, and polyamide polymers such as those available from Union Camp (Unirez) or Hulls (Vestamelt) or EMS-Chemle (Griltex). The polymers added may be amorphous or crystalline, but at least 5% of a crystalline polymer is required to achieve adequate properties.

Preferred among these crystalline polymers are other polyester polymers such as those available from EMS-Chemle, Sumter, S.C., under the tradename Griltex, or from Huls America, Piscataway. N.J., under the tradenames Dynapol and Dynacoll (lower molecular weight). Also preferred are polyamides such as those available from Union Camp, Wayne, N.J., under the Unirez tradename or copolyamides available from Hüls under the Vestamelt tradename and also from EMS-Chemle also under the Griltex name. By crystalline is meant the saturated polyesters and dimer acid based polyamides which are described in the Handbook of Adhesives, p. 478, C. Rossitto.

It may also be desirable to incorporate into the hot melt adhesive up to 20% by weight of certain other hydrophilic non-crystalline polymers such as hydroxyethyl cellulose, hydroxypropyl cellulose, polyvinyl methyl ether, polyvinylpyrrolidone, polyethyloxazoline, starch or cellulose esters, particularly the acetates with a degree of substitution less than 2.5; the latter polymers functioning to increase the water sensitivity of the adhesives which may be desired for some applications.

Other hydrophobic compatible polymers include elastomeric polymers such as styrene containing block copolymers, e.g., styrene-isoprene-styrene, epoxidized polyisoprene, styrene-butadiene-styrene, styrene-ethylene butylene-styrene, styrene-ethylene propylene styrene may also be present at levels up to about 30% by weight. Of these polymers, those based on styrene-isoprene-styrene are most preferred.

Among the applicable stabilizers or antioxidants which may be included herein are high molecular weight hindered phenols and multifunctional phenols such as sulfur and phosphorous-containing phenols. Representative hindered phenols include: 1,3,5-trimethyl-2,4,6-tris(3,5-di-tert-butyl-4-hydroxyphenyl) proplonate; n-octadecyl 3,5-di-tert-butyl-4-hydroxyphenyl) proplonate; 4,4'-methienebis (2,6-di-tert-butylphenol); 4,4'-thiobis (6-tert-butyl-o-cresol); 2,6-di-tert-butylphenol; 6-(4-hydroxyphenoxy)-2,4-bis(n-octylthio)-1, 3,5-triazine; di-n-octadecyl-3,5-di-tert-butyl-4-hydroxybenzylphosphonate; 2-(n-octylthio)-ethyl 3,5-di-tert-butyl-4-hydroxybenzoate; and sorbitol hexa[3-(3,5-di-tert-butyl-4-hydroxyphenyl)propionate]. If used, the stabilizer is present in levels of about 0.1 to 3% by weight.

Optional additives may be incorporated into the hot melt compositions in order to modify certain properties thereof. Among these additives may be included colorants such as titanium dioxide; and fillers such as talc and clay, etc.

The hot melt adhesive compositions of the invention may be formulated using techniques known in the art. An exemplary procedure involves placing approximately 40% of the total tackifying resin concentration with all the polymer, wax, plasticizers and stabilizers in a jacketed mixing kettle, preferably in a jacketed heavy duty mixer, which is equipped with rotors and thereupon raising the temperature to a range of from up to about 190° C. After the resin has melted, the temperature is lowered to 150° to 165° C. Mixing and heating are continued until a smooth, homogeneous mass is obtained whereupon the remainder of the tackifying resin is thoroughly and uniformly admixed therewith.

As noted above, the sulfonated polyester containing hydrophilic hot melt adhesives of the invention will be formulated differently depending upon the particular end use. Specifically, hot melt adhesives for various end uses are described below.

with a stirring paddle was charged with 40% of the tackifying resin and/or diluent. After melting of the resins, stirring was then initiated whereupon the polyester was added slowly at 165° C. over a one-half hour period after which the temperature was lowered to 150° C. Heating and stirring were continued until a homogeneous mass was obtained whereupon the remainder of the tackifying resin and/or diluent was admixed therewith.

|  | Roll Wrap | Case and Carton Sealing | Tissue Ply Bonding | Constr. | Bottle Labeling | Bag Ending | Non Woven Binder Fibers/Films |
|---|---|---|---|---|---|---|---|
| Polyester Tackifier | 30–80 | 30–80 | 30–80 | 20–90 | 30–80 | 30–80 | 50–90 |
| Polar Plasticizer | 0–30 | 0–30 | 0–30 | 0–60 | 0–20 | 0–20 | 0–40 |
| Non-polar Plasticizer | 0–20 | 0–20 | 0–20 | 0–20 | 0–20 | 0–20 | 0–20 |
| Polar Waxes | 0–60 | 0–60 | 0–60 | 0–30 | 10–50 | 0–30 | 0–30 |
| Non-polar Waxes | 0–10 | 0–10 | 0–10 | 0–10 | 0–10 | 0–10 | 0–10 |
| Polar Other Polymers | 10–40 | 10–40 | 10–40 | 0–30 | 10–50 | 10–40 | 0–30 |
| Non-polar Other Polymers | 0–10 | 0–10 | 0–10 | 0–10 | 0–10 | 0–10 | 0–10 |
| Hydrophilic | 0–20 | 0–20 | 0–20 | 5–30 | 0–30 | 0–10 | 0–30 |
| Hydrophobic | 0–15 | 0–15 | 0–15 | 0–30 | 0–30 | 0–30 | 5–60 |

As noted above, the resulting adhesives may be employed in a wide variety of uses as are known in the art. The crystalline wax containing adhesives may be effectively utilized in a variety of packaging and carton sealing applications. The non-pressure sensitive adhesives may also be used to bind a plurality of sheets in a wide range of bookbinding operations. They may also be used for laminating tissue and/or screen-reinforced tissue layers such as are used in individual or roll use applications as in wipers, paper towels, toilet tissue and other consumer or industrial end uses. When formulated with plasticizers, the resultant adhesives may be used in the assembly or construction of various disposable applications including, but not limited to, sanitary napkins, disposable diapers, hospital gowns, bed pads and the like. In particular, adhesives are useful for the construction of disposable articles using multi-line, spray, or slot-coating construction techniques wherein at least one flexible film substrate is bonded to at least one tissue, non-woven, polyolefin or other flexible polymeric film substrate. In addition, the adhesives may be useful in the bonding of elastic to polyethylene, polypropylene or nonwoven substrate so as, for example, to impart elongation resistant gathers thereto.

With high levels of crystalline polymers, adhesives suitable as films or binder fibers can be prepared. Generally at least 15 and preferably 20–40% crystalline polymer is required for these applications. In contrast construction adhesives require a high degree of flexibility, but still need at least 5% of a crystalline polymer to avoid cold flow, preferably 5 to 10%.

in the following illustrative examples all parts are given by weight and all temperatures in degrees Celsius unless otherwise noted.

EXAMPLES

In preparing the following samples, a heavy duty mixer which had been heated to 165° C. and which was equipped The samples were tested using the following procedures:

Viscosity measurements were determined after 30 minutes using a Brookfield viscometer (Spindle 27).

The adhesive was also subjected to Peel/Shear testing such as is conventionally required in the packaging industry. Peel Temperature Test: A bead of test adhesive approximately ⅛ inch in diameter is applied at 325° F. to 350° F. with a glass rod onto 60 pound/ream kraft paper. A second sheet of the same paper is superimposed on the first sheet within 2 seconds and pressed thereto to form a kraft-to-kraft bond. The bonded sheets are then cut perpendicular to the adhesive line into 1 inch wide strips. Duplicate bonded specimens are placed in an oven with one free end of the specimen attached to a fixed support and a 100 gram load suspended from the other sheet at the same end of the bond. The oven temperature is then increased in 10° F. increments at 15 minute intervals. The temperature at which bond delamination occurred is specified as the peel temperature.

Shear Temperature Test: Samples are prepared as in peel temperature test but separate sheets of Kraft at opposite ends of the bonded specimen are suspended and weighted to stress the bond in a shear mode. The temperature of the oven is increased as in peel test until failure occurs.

Adhesion Test: A molten bead of hot melt at 325° F. to 350° F. was drawn across the middle (widthwise) of a 1"×3" strip of corrugated paper. A second strip of corrugated paper was then immediately superimposed upon the first and a 100 gram weight placed on top of the construction. The kraft-to-kraft bonds were then aged 24 hours at room temperature. After aging, the samples were stressed by hand at the temperature noted (0° F., 20° F. or 40° F.) In a 90° peel mode. The presence of complete fiber tear (F.T.) indicates excellent adhesion.

Tack and Range were measured by drawing out a 3 mil thick adhesive film and qualitatively measuring the tack by determining how many successive finger prints could be made in the film before it set. The range or open time indicates the number of seconds during which the finger prints can be made. Cigarette plug adhesion was measured by applying a bead of adhesive to cigarette plug paper, forming a bond and conditioning the bond for 24 hours at room temperature. After conditioning, the bonds were pulled at 180° mode by hand.

Some of the adhesives were also tested for thermal stability by storing at 275° F. for 24 hours. After the testing period, remove the jar, check for the following:
a. Skin
b. Dirt/char particles
c. Sedimentation—partial skin precipitating and falling to the bottom of the jar.
d. Volatile char
e. Gelation—carefully examine the contents with a glass stirring rod for signs of gels or lumps.
f. Color or odor
g. Product separation—the presence of distinct layers, also known as phasing.

Water Dispersibility Test (TAPPI UM 666)

The purpose of TAPPI UM 666 is to test the dispersibility, or to quantify the degree of dispersibility of adhesives in water. The adhesive is prepared for testing by drawing down a coating on a teflon coated sheet. Typically a 3 mil coating is drawn down. The adhesive is chipped or scraped from the teflon sheet and ready for testing.

A 1.0 gram sample of adhesive is added to 700 ml of room temperature (R.T.) distilled water in a blender. Agitation begins a high speed, and continues for five minutes. All potential hang ups are loosened with a glass rod, during the mixing. At the conclusion of the mixing, the adhesive is filtered through a 60 mesh screen that is preweighed. The metal screen is place in a 177° C. oven and dried to a constant weight. The % adhesive dispersed is calculated as:

$$\frac{\text{Weight of sample} - \text{Amount retained on the screen}}{\text{Weight of Sample}} \times 100 = \text{Adhesive Dispersed, \%}$$

Compatibility is determined by placing the hot melt (100 g) in a glass jar in an oven (typically 275° F.) for 24 hrs., and observing whether physical separation occurs on a macroscopic scale in the hot melt formulation. Opacity at any level is an indication of marginal compatibility.

Blocking Tests: A Drawdown film was cast onto Kraft paper. The 3 mil coating was then cut into 1"×3" strips. Then 3 strips were plied atop coated to non-coated, placed in the oven at the desired temperature, and a weight placed on top of the pile to apply a 3 psi blocking force.

The polyesters utilized in the examples were obtained form Eastman Chemical (X-24272-126 and X-24539-9 are commercially available as AQ1950, X-24539-27 commercially available as AQ 14000 and X-24539-5 commercially available as AQ1045 and exhibit the properties shown in the following table. Tg's were measured by differential scanning calormetry (DSC) at a heating rate of 20° C./min. on predried samples. Tg's (glass transition temperatures) and inherent viscosities (IV) were provided by the supplier.

| | Polyester Properties | | | | | |
|---|---|---|---|---|---|---|
| | X-23950-198 | X-24272-126 | X-24539-5 | X-24539-27 | X-23950-39 | X-24539-9 |
| Viscosity | | | | | | |
| 177° C. | 66,100 | 29,000 | 5,710 | — | 3,570 | — |
| 190° C. | 46,800 | 16,000 | 2,620 | — | 2,300 | 62,800 |
| 200° C. | — | — | — | 255,000 | — | — |
| Tg (°C.) | 0° to 4° | 0° | — | — | ~0° | — |
| IV | 0.45–0.59 | 0.4 | 0.30 | 0.6 | 0.21–0.34 | ~0.4 |

Example I

The following examples show how the water sensitive sulfonated polyesters can be formulated into a nonpressure sensitive packaging grade hot melt adhesives.

TABLE 1

| Polymers | 1 | 2 | 3 | 4 | 5 | 6 |
|---|---|---|---|---|---|---|
| Eastman X-24274-126 | 60 | | 60 | | 60 | 60 |
| Eastman X-23950-198 | | 40 | | 70 | | |
| EnBA[1] | | | 5 | | | |
| Nirez 300 | 10 | 20 | 5 | 10 | | 5 |
| DNP-100 | 10 | 20 | 10 | 10 | 15 | 10 |
| Paricin 220 | 20 | 20 | 20 | 10 | 25 | 25 |
| Santovar A[2] | 0.5 | 0.5 | 0.5 | 0.5 | 0.5 | 0.5 |
| TNPP[3] | 0.5 | 0.5 | 0.5 | 0.5 | 0.5 | 0.5 |

[1]Ethylene n-butyl acrylate was obtained from Elf Atochem. It contains 33–35% of butyl acrylate and exhibits a melt index of 900.
[2]2,5 di-tert-amylhydroquinone Antioxidant from Monsanto Chemical Co.
[3]Trisnonyl phenyl phosphite from General Electric Chemicals In Table 1, samples 1 and 2 are examples of case and carton seal formulations using different molecular weight sulfonated polyester polymer bases. Sample 3 is an example of a case and carton seal adhesive which is improved in physical properties due to the addition of EnBA to the adhesive blend. Sample 4 is an example of a bag ending formulation while sample 5 shows an adhesive used in a tissue/tubewinding application. The latter sample can also be used in a bottle labeling application since adhesion was observed when bonding a polypropylene film to a polyethylene terephthalate (PET) substrate. Sample 6 is an example of a roll wrap adhesive, and when this adhesive was applied to cigarette plug wrap paper, complete fiber tear was observed.

Specific details on the testing of these adhesives are presented in Tables 2 and 3. In those Tables, it is important to note that, despite the use of Nirez 300 a terpene phenolic tackifier which is typically not water dispersible, formulations 1 and 3 were shown to be readily dispersible. In the present compositions because the sulfonated polyester is very water sensitive, incorporating the tackifier into the adhesive formulation does not inhibit the water sensitivity of the adhesive formulations.

TABLE 2

| Test Results | 1 | 2 | 3 |
|---|---|---|---|
| Viscosity (cps) | | | |
| 275° F. | 3510 | 2980 | 3250 |
| 300° F. | 1790 | 1850 | 2105 |
| Peel (°F.) Kraft/Kraft | 130 | 130 | 140 |
| Shear (°F.) Kraft/Kraft | 180 | 180 | 180 |
| Corrugated Adhesive | | | |
| RT (Room Temperature) | 100% F.T. | 100% F.T. | 100% F.T. |
| 40° F. | 100% F.T. | 100% F.T. | 100% F.T. |
| 20° F. | 50% F.T. | 50% F.T. | 100% F.T. |
| 0° F. | 25% F.T. | 25% F.T. | 100% F.T. |
| Tack | Aggressive | Aggressive | Aggressive |
| Range | 3 sec. | 3 sec. | 3 sec. |
| Heat Stability 275° F. @ 72 hrs. | | | |
| Color | Lt. Yellow | Lt. Yellow | Lt. Yellow |
| Skin | None | None | None |
| Gel | None | None | None |
| Separation | None | None | None |
| Edge Ring | None | None | None |
| Final Viscosity | 2500 cps | 2100 cps | 2400 cps |
| Dispersibility (TAPPI UM 666) | 99% | N/T | 99% |

N/T = not tested

The test results presented in Table 2 show the adhesives to be particularly suitable for packaging applications such as case and carton sealing due to its low viscosity, good fiber tear and acceptable peel and shear values, with sample 3 showing improvement with the added EnBA component. Repulpability testing was done to measure the dispersability and samples 1 and 3 were chosen to demonstrate that the adhesives were completely dispersible.

TABLE 3

| Test Results | 4 | 5 | 6 |
|---|---|---|---|
| Viscosity (cps) | | | |
| 275° F. | 11,760 | 1800 | 2050 |
| 300° F. | 7,830 | 900 | 1100 |
| Peel (°F.) Kraft/Kraft | 150 | 120 | 130 |
| Shear (°F.) Kraft/Kraft | 180 | 190 | 190 |
| Tack | Aggressive | Aggressive | Aggressive |
| Range | 3 sec. | 3 sec. | 3 sec. |
| Adhesion to Kraft | | | |
| RT | 100% F.T. | 100% F.T. | 100% F.T. |
| 40° F. | 100% F.T. | 100% F.T. | 100% F.T. |
| 20° F. | 100% F.T. | 100% F.T. | 100% F.T. |
| 0° F. | 100% F.T. | 100% F.T. | 100% F.T. |
| 100° F. @ 90% RH (Relative Humidity) | 100% F.T. | 100% F.T. | 100% F.T. |
| Cigarette Plug Wrap | N/T | N/T | Excellent |
| Adhesion Polypropylene/PET | N/T | Excellent | N/T |
| Heat Stability 275° F. @ 72 hrs. | | | |
| Color | Lt. Yellow | Lt. Yellow | Lt. Yellow |
| Skin | None | None | None |
| Gel | None | None | None |
| Edge Ring | None | None | None |
| Separation | None | None | None |
| Final Viscosity (cps) | 8600 | 1300 | 1400 |

The test results presented in Table 3 show sample 4 to be particularly suitable for bag ending adhesive applications due to the higher viscosity, good fiber tear and good heat adhesion. Sample 5 is found to be ideally suited for tissue/tubewinding due to the lower viscosity, good adhesion, and tack. In addition, because of the adhesion of polypropylene film to PET it can also be used for bottle labeling applications. Sample 6 can be suited for roll wrap applications as well as cigarette applications due to the excellent balance of heat and low temperature adhesion as well as the lower viscosity.

Example II

The polymers were also used to prepare adhesives suitable for construction of disposable articles. In these samples, sucrose benzoate was used as the tackifier to give improved biodegradable properties. Sucrose Benzoate (ASG) is the alcohol soluble grade which is more polar than the regular grade because it has more unreacted hydroxyl groups. In Sample 7 described in Table 4, the adhesive was combined with a water soluble pigment for use as a wetness indicator. The pigment used was a blend of pigments in a rosin ester tackifier using Basacid Blue 750, a water soluble organic dye from BASF as the active ingredient.

TABLE 4

| Polymers | Sample 7 |
|---|---|
| Eastman X-24539 | 57 |
| Sucrose Benzoate ASG | 20 |
| DNP 100 | 9 |
| Paricin 220 | 13.3 |
| Irganox 1010 | 0.5 |
| TNPP | 0.5 |
| Pigment | 0.7 |

Irganox 1010 is a hindered phenol antioxidant

The viscosity of such an adhesive is 2400 cps @ 275° F. The adhesive turned blue when contacted with water, it was also found that the sucrose benzoate had excellent compatibility and did not inhibit the water sensitivity of the formulation, even when used at high levels.

Example III

In the following example, sample 8 is an example of a non-pressure sensitive hot melt adhesive for packaging/case and carton seal application.

TABLE 5

| | 8 |
|---|---|
| X-23950-198 | |
| X-24274-126 | 60 |
| Sucrose Benzoate (ASG) | 10 |
| Surfonic DNP-100 (Huntsman) | 10 |
| Paricin 220 | 20 |
| Irganox 1010 | 0.5 |
| TNPP | 0.5 |
| @250° F. | N/T |
| @275° F. | 2,375 |
| @300° F. | N/T |

Example IV

Additional testing was done to ascertain the compatibility of the sulfonated polyester (X-24539-9) with various tackifying resins. In this testing, 50 parts of the polyester were combined with 50 parts of the tackifier. The polyester was found to be compatible with polar tackifiers including Foral NC a non crystallizing polar ionic tackifying agent comprising hydrogenated wood rosin, Foral AX a thermoplastic, acidic polar non-ionic tackifying resin produced by hydrogenating wood rosin and Nirez 300.

Similar compatibility tests were done using 75 parts of the low molecular weight sulfonated polyester (X-23950-39) with 25 parts plasticizer. In this testing, the following plasticizers were evaluated: Surfonic L12-8 which is a linear alcohol ethoxylate with a linear, primary 11–12 carbon alcohol in a molar ratio of 8 to 1 (oxide to alcohol) L12-8 has a HLB (hydrophilic lipophilic balance) of 13.6, flash point (PMCC) of 400° F. and is available commercially from Huntsman; Citroflex-2™ a triethycitrate with a MW of 276 and a flash point (COC) of 155° C. available commercially from Morflex™; Texox 440 an ethoxylated glycerine with a MW of 490 and a flashpoint (COC) of 500° F. available commercially from Huntsman. In all the formulations, the above-listed plasticizers yielded products which were clear, smooth flowing and compatible.

Various plasticizers were also evaluated in combination with two other sulfonated polyesters, wax and tackifier as shown in Table 6. in this evaluation, mineral oil which is non-polar was found to be incompatible.

TABLE 6

|  | 9 | 10 | 11 | 12 | 13 | 14 | 15 |
|---|---|---|---|---|---|---|---|
| (X-24539-27) | 60 | 30 |  |  |  |  |  |
| (X-24272-126) |  |  | 60 | 60 | 60 | 60 | 60 |
| Santicizer 160 | 20 |  |  |  |  |  |  |
| Benzoflex 50 |  | 15 |  |  |  |  |  |
| Benzoflex 2-45 |  |  | 10 |  |  |  |  |
| High OH Pycal 94 |  |  |  | 10 |  |  |  |
| Macol 206EM |  |  |  |  | 10 |  |  |
| Surfonic DNP-100 |  |  |  |  |  | 10 |  |
| Mineral Oil |  |  |  |  |  |  | 10 |
| Kenamide S | 15 | 25 |  |  |  |  |  |
| Paricin 220 |  |  | 25 | 25 | 25 | 25 | 25 |
| Nirez 300 | 5 |  | 5 | 5 | 5 | 5 | 5 |
| Foral NC |  | 30 |  |  |  |  |  |
| Compatibility | Yes | Yes | Yes | Yes | Yes | Yes | No |

The polyester plasticizer, RX-13557 is a polymeric plasticizer supplied by C. P. Hall Company. This plasticizer has a viscosity of 900 cps at 25° C., an acid value of 0.70 mg KOH/g and a hydroxyl value of 132.

Suitable waxes such as N-(2-hydroxyethyl)-12-hydroxy stearamide (e.g., Paricin 220, commercially available from Cas Chem Inc.) and stearamide (e.g., Keramide S, commercially available from Witco Chemical Co.), were shown to be compatible with the sulfonated polyester in the following hot melt formulations. Other waxes found to be compatible are Sorbitan monostearate, (Estol 3715, commercially available from Unichema international), Glycerol Monostearate (commercially available from Unichema international) hydroxystearic acid (commercially available from Cas Chem Inc.).

Other waxes such as ketone-modified polyethylenes (ethylene/carbon monoxide copolymers) (A-C 830 commercially available from Allied-Signal), ethylene-vinyl acetate copolymers, 13% vinyl acetate (A-C 400, commercially available from Allied-Signal), hydrocarbon waxes (paraffin, commercially available from Sasol Inc.), and linear aliphatic mono-alcohol waxes such as Unilin 425, commercially available from Petrolite Company do not show compatibility when formulated with the sulfonated polyester into a hot melt, at the 10% level, due to a low concentration or absence of polar groups as shown in the following table.

Other non-polar waxes commonly employed in non-pressure sensitive packaging adhesives were also incompatible in the formulation of example 24, when used as the sole wax component at the 10% level. These waxes are Paraflint C-1, a Fischer-Tropsch wax available from Moore and Munger, Bowax 845 a microcrystalline wax available from Petrolite, Paraflint H-4 a synthetic wax available from Moore and Munger. Also incompatible in this formulation at this level was Kemamide W-40, a less polar wax of molecular weight above 500 g/mole. Incompatibility was indicated by separation of the wax to form a surface layer on the adhesive when molten.

| | WAX DESCRIPTION | | | |
|---|---|---|---|---|
| | WAX | MOLECULAR WEIGHT (g/mol) | NUMBER OF POLAR FUNCTIONAL GROUPS/MOLECULE | EQUIV/g POLAR GROUPS |
| Polar | Paricin 220 | 320 g/mol | 3 | $9.2 \times 10^{-3}$ |
| Polar | Kemamide S | 283 | 1 | $3.5 \times 10^{-3}$ |
| Less Polar | Kemamide W-40 | 592 | 2 | $3.4 \times 10^{-3}$ |
| Less Polar | Castor Wax | 939 | 3 | $3.2 \times 10^{-3}$ |
| Polar | Glycerol Monostearate | 359 | 2 | $5.6 \times 10^{-3}$ |
| Polar | Sorbitan Monostearate | 419 | 3 | $7.2 \times 10^{-3}$ |
| Polar | 12-Hydroxy Stearic Acid | 300 | 2 | $6.7 \times 10^{-3}$ |
| Less Polar | Unilin 425 | 450 | 1 | $2.3 \times 10^{-3}$ |

TABLE 7

| | 16 | 17 | 18 | 19 | 20 | 21 | 22 | 23 | 24 |
|---|---|---|---|---|---|---|---|---|---|
| Eastman: X-23950-196 | 30 | 30 | 30 | 30 | 30 | 30 | | | |
| Eastman AQ 1950 | | | | | | | 30 | 30 | 30 |
| Foral NC | 30 | 30 | 30 | 30 | 30 | 30 | | | |
| Nirez 300 | | | | | | | 30 | 30 | 30 |
| Benzoflex 50 | 30 | 30 | 30 | 30 | 30 | 30 | | | |
| Polyester Plasticizer RX-13557 (C.R Hall) | | | | | | | 30 | 30 | 30 |
| Paricin 220 | 10 | | | | | | | | |
| AC-830 | | 10 | | | | | | | |
| AC-400 | | | 10 | | | | | | |
| Paraffin Wax | | | | 10 | | | | | |
| Keramide S | | | | | 10 | | | | |
| Unilin 425 | | | | | | 10 | | | |
| Sorbitan Monostearate | | | | | | | 10 | | |

TABLE 7-continued

|  | 16 | 17 | 18 | 19 | 20 | 21 | 22 | 23 | 24 |
|---|---|---|---|---|---|---|---|---|---|
| Hydroxystearic Acid |  |  |  |  |  |  |  | 10 |  |
| Glycerol Monostearate |  |  |  |  |  |  |  |  | 10 |
| Compatibility | Yes | No | No | No | Yes | No | Yes | Yes | Yes |

Example V

The following examples demonstrate the compatibility of the sulfonated polyesters with other polyester polymers. These were blended at 325° F. in a 100 gram sigma-blade mixer.

TABLE 8

|  | 25 | 26 |
|---|---|---|
| X-24539-27 | 75 grams | 75 grams |
| Dynapol S1402 | 50 grams | — |
| Dynacoll 7110 | — | 50 grams |
| Stability |  |  |
| (275° F., 24 hrs.) |  |  |
| color | white | amber |
| skin | none | none |
| edge ring | none | none |
| separation | none | none |

In these examples, the sulfonated polyester used was higher in viscosity than the previous samples, which renders it the most difficult to compatibilize. Nonetheless it exhibited excellent compatibility with Dynapol S1402, a linear saturated polyester resin, with a melting point of 62° C., and Dynacoll 7110, a polyester diol with a molecular weight of 2000. Both polyesters were obtained from Huls.

Example VII

The following example shows how XR-4136, a glycerol ester of rosin with a small amount of pentaerythritol ester of rosin (available commercially from Union Camp), provides acceptable compatibility with the low MW sulfonated polyester, although not as good as a terpene phenolic, such Nirez 300. The Nirez 300 is clear, while the XR-4136 and Unitac 100 L are hazy. Also, Piccolastic A75, a 100% polystyrene with at 75° C. B&R softening point (available commercially from Hercules) is not as compatible with the high MW sulfonated polyester due to an opaque appearance and bleeding, compared to Foral NC used at the same level.

TABLE 9

|  | 27 | 28 | 29 | 20 |
|---|---|---|---|---|
| Eastman X-23950-39 | 50 | 50 | — | — |
| Eastman X23-950-198 | — | — | 30 | 30 |
| XR-4136 | 40 | — | — | — |
| Unitac R-100L | — | 40 | — | — |
| Piccolastic A75 | — | — | 40 | — |
| Foral NC | — | — | — | 40 |
| Benzoflex 50 | 10 | 10 | 30 | 30 |
| Irganox 1010 | — | — | 0.5 | 0.5 |
| Heat Stability: |  |  |  |  |
| 24 hr. @275° F., |  |  |  |  |

TABLE 9-continued

|  | 27 | 28 | 29 | 20 |
|---|---|---|---|---|
| Covered |  |  |  |  |
| Color | Hazy Yellow | Hazy Yellow | Opaque White | Clear Amber |
| Skin | None | None | None | None |
| Gel | None | None | None | None |
| Separation | None | None | None | None |
| Edge Ring | None | None | None | None |

Example VII

The following examples show that a higher molecular weight-polar wax ($3.2 \times 10^{-3}$ equiv/g), Castor Wax (available commercially from CasChem, Inc.) with a 87° C. melting point is not compatible with the high MW sulfonated polyester at high levels. Castor Wax's incompatibility is demonstrated by an opaque appearance and "snotty", or unsmooth flow when hot. Also Castor Wax separated in heat stability tests over a 24 hour time at 275° F.

TABLE 10

|  | 31 | 32 |
|---|---|---|
| Eastman X-23950-198 | 30 | 30 |
| Uratak 68520 | 40 | 40 |
| Castor Wax | 20 | 20 |
| Surfonic DNP-100 | 10 | — |
| Benzoflex 50 | — | 10 |
| Irganox 1010 | 0.5 | 0.5 |

Example X

This example illustrates the use of another commercially available sulfonated polyester polymer (Eastman AQ 38S) containing all aromatic di-acids of the (a) component. In this example, 50 parts of the sulfonated polyester were combined with 40 parts Pycal 94 and 10 parts Paricin 220. The resulting hot melt was compatible with no phase separation even after 24 hrs. at 275° F. The viscosity of this product was 1600 cps @ 275° F. and had a −12.5% change in viscosity during the 24 hour period. The product had a fiber tearing bond to kraft paper.

EXAMPLE IX

This example demonstrates that waxes are needed to achieve low viscosity adhesives with the required high peel/shear failure temperatures.

TABLE 11

|  | 33 | 34 | 335 | 36 |
|---|---|---|---|---|
| Eastman AQ 1950 | 60 | 60 | 60 | 60 |
| CP Hall RX-13557 | 15 | 10 | 10 | 15 |
| Paricin 220 | 15 | 25 | — | — |
| Nirez 300 | 10 | 5 | 5 | 10 |
| Santovar A | 0.5 | 0.5 | 0.5 | 0.5 |
| TNPP | 0.5 | 0.5 | 0.5 | 0.5 |
| Viscosity at 275° F. (cps) | 2450 | 1650 | 14,000 | 7,500 |
| Peel Failure (K/K °F.) | 135 | 140 | <100 | <100 |
| Shear Failure (K/K °F.) | 180 | 180 | <100 | <100 |

EXAMPLE X

These examples demonstrate that by incorporating a crystalline polyester (Griltex 8) compositions with faster set and improved blocking resistance were obtained.

TABLE 12

|  | 37 | 38 | 39 | 40 | 41 | 42 | 43 |
|---|---|---|---|---|---|---|---|
| Eastman AQ 14000 | 80 | 75 | 70 | 60 | 60 | 60 | 60 |
| Paricin 220 | 15 | 15 | 15 | 20 | 20 | 20 | 20 |
| Griltex 8 G | 5 | 10 | 15 | — | 10 | — | 5 |
| Dynapol S 1402 | — | — | — | 10 | — | 5 | — |
| C.P. Hall RX13557 | — | — | — | 10 | 10 | 15 | 15 |
| TNPP | 0.5 | 0.5 | 0.5 | 0.5 | 0.5 | 0.5 | |
| Santovar A | 0.5 | 0.5 | 0.5 | 0.5 | 0.5 | 0.5 | 0.5 |
| Viscosity: 275° F. (cps) | N/T | N/T | N/T | 21,900 | 19,800 | 11,625 | 10,200 |
| 300° F. | N/T | N/T | N/T | 11,175 | 10,650 | 6,950 | 5,675 |
| 350° F. | 35,000 | 32,000 | 31,800 | N/T | N/T | N/T | N/T |
| 375° F. | 17,200 | 16,500 | 17,050 | N/T | N/T | N/T | N/T |
| Peel Failure (°F.) | N/T | N/T | N/T | 165 | 165 | 165 | 150 |
| Shear Failure (°F.) | N/T | N/T | N/T | 180 | 180 | 180 | 180 |
| Heat Stability @ 275° F. for 24 hours | | | | | | | |
| Skin | N/T | N/T | N/T | None | None | None | None |
| Gel | N/T | N/T | N/T | None | None | None | None |
| Edge Ring | N/T | N/T | N/T | None | None | None | None |
| Color | N/T | N/T | N/T | Dark Yellow | Dark Yellow | Dark Yellow | Dark Yellow |
| Char | N/T | N/T | N/T | None | None | None | None |
| Separation | N/T | N/T | N/T | Swirl | Swirl | Swirl | Swirl |
| Viscosity (cps) | N/T | N/T | N/T | 11,900 cps | 9,650 cps | 5,900 cps | 5,381 cps |
| Δ Viscosity (%) | N/T | N/T | N/T | −45.6% | −51.2% | −49.2% | −47.2% |

Additionally, in order to demonstrate the effect of the Griltex on blocking resistance. Sample 38 was compared with two other similar samples, one containing only the Eastman polymer and the other containing the polymer, wax and stabilizer but no Griltex. The sample containing only the polymer blocked in the 100° F. test, while the formulated sample (without Griltex) blocked at 120° F. In contrast, no blocking occurred in Sample 2 under either test condition.

Example XI

These formulations are designed for bookbinding and bag ending. Crystalline polyester were added to improve blocking resistance and add strength.

TABLE 13

| CONTROL | | 44 | 45 | 46 | 47 | 48 |
|---|---|---|---|---|---|---|
| Eastman AQ 14000 | 70 | 60 | 65 | 60 | 60 | 60 |
| CP Hall RX 13557 | 10 | 10 | 10 | 5 | 5 | 10 |
| Paricin 220 | 20 | 20 | 20 | 25 | 25 | 20 |
| Dynacol S 1402 | — | 10 | 5 | 10 | — | |
| Griltex 8 G | — | — | — | — | 10 | 5 |
| Santovar A | 0.5 | 0.5 | 0.5 | 0.5 | 0.5 | 0.5 |
| TNPP | 0.5 | 0.5 | 0.5 | 0.5 | 0.5 | 0.5 |
| Viscosity: 275° F. | 12,300 | 21,900 | 22,850 | 18,050 | 20,100 | 23,150 |
| (cps) 300° F. | 7,150 | 11,175 | 12,575 | 10,600 | 10,525 | 13,870 |
| Heat Stability @ 275° F. 72 hours | | | | | | |
| Skin | None | None | None | None | None | N/T |
| Gel | None | None | None | None | None | N/T |
| Edge Ring | None | None | None | None | None | N/T |
| Color | Brown | Brown | Brown | Brown | Brown | N/T |
| Char | None | None | None | None | None | N/T |
| Separation | None | Slight Swirl | Slight Swirl | Slight Swirl | Slight Swirl | N/T |
| Viscosity | 7500 cps | 6425 cps | 4687 cps | 3550 cps | 5162 cps | N/T |
| Δ Viscosity (%) | −38% | −71.8% | −74.0% | −82.3% | −77.7% | N/T |
| Peel (°F., K/K) | 160 | 163 | 125 | 175 | 156 | N/T |
| Shear (°F., K/K) | >180 | 190 | 190 | 200 | 190 | N/T |
| Blocking Test | | | | | | |
| at 100° F. | Blocked | Slightly Blocked | Slightly Blocked | Slightly Blocked | Non Block | Non Block |
| at 120° F. | Blocked | Blocked | Blocked | Blocked | Non Block | Very slightly blocked at edges |

Example XII

These formulations incorporate an aromatic sulfonated polyester (Eastman AQ 55S) with greater water sensitivity to offset the reduction in water sensitivity due to incorporation of high levels of crystalline polyester (Griltex 8).

TABLE 14

| | 49 | 50 | 51 | 52 |
|---|---|---|---|---|
| Eastman AQ 1950 | 50 | 45 | 50 | 45 |
| Eastman AQ 55.S | 10 | 10 | — | 5 |
| Griltex 8 G | 35 | 35 | — | 40 |
| Paricin 220 | 5 | 10 | 10 | 10 |
| Santovar A | 0.5 | 0.5 | 0.5 | 0.5 |
| TNPP | 0.5 | 0.5 | 0.5 | 0.5 |
| Dynapol S.1402 | — | — | 40 | — |
| Viscosity 350° F. | 59,100 | 27,500 | 15,600 | 41,000 |
| Heat Stability 72 hours at 350° F. | | | | |
| Skin | None | None | None | None |
| Gel | None | None | None | None |
| Edge Ring | None | None | None | None |
| Char | None | None | None | None |
| Color | Brown | Brown | Brown | Brown |
| Separation | Large Swirl | Large Swirl | Large Swirl | Large Swirl |
| Viscosity (cps) | 41,400 | 18,025 | 5712.5 | 11,875 |
| Δ Viscosity (%) | −29.9% | −34.4% | −63.3% | −71.0% |

Films melt pressed from Example 49 were strong yet dispersed readily in tap water.

Example XIII

This example demonstrates the improved blocking and heat resistance of an adhesive of the present invention in comparison to a commercial water-sensitive adhesive based on graft copolymer technology (B) sold by National Starch and Chemical Company. Additionally, tests were done using a hydrophobic control adhesive (A) also sold by National Starch.

TABLE 15

| | 53 |
|---|---|
| Eastman AQ 1950 | 65 |
| Griltex 8 G | 15 |
| Paricin 220 | 20 |
| TNPP | 0.5 |
| Santovar A | 0.5 |
| Temperature (°F.) | Viscosity (cps) |
| 275 | 20,825 |
| 300 | 12,025 |
| 325 | 7,538 |
| 350 | 4,750 |
| Property | 120 hr/300° F. |
| Skin | None |
| Gel | None |
| Edge Ring | None |
| Char | None |
| Color | Clear light tan |
| Odor | Slight |
| Separation | None |
| Viscosity | 3350 |
| Δ Viscosity (%) | −72.1% |

| Property | 53 | A | B |
| --- | --- | --- | --- |
| Peel Failure (°F., Kraft/Kraft) | 175 | 140 | 155° |
| Shear Failure (°F., Kraft/Kraft) | 200 | 200 | 190 |
| Blocking Resistance | | | |
| 140° F. | No Blocking | No Blocking | Blocked |
| 160° F. | Slight Blocking | No Blocking | Strong Blocking |
| Peel Failure (100° C./90% RH) | 2½ hr. | >24 hr. | >24 hrs. No Fiber Tear |
| Humidity Failure | Pulled Fiber Tear | Pulled Fiber Tear | Strong Blocking |
| Humidity Blocking 100° F. 24 hour/95% R/4 | No block | No block | Blocked |
| Viscosity Profile (cps) | | | |
| 300° F. | 12,000 | 15,000 | 1500 cps |
| 325° F. | 8,000 | 10,500 | 1000 |
| 350° F. | 5,000 | 8,000 | 700 |
| 5 Minute Mix Dispersibility (wt. %) | 61.8 | 1.0 | 89.2 |
| 10 Minute Mix Dispersibility (wt. %) | 79.3 | 7.2 | 97.8 |

Example XIV

This example demonstrates the compatibility of a sulfonated polyester with a crystalline polyamide resin, Unirez 2638 available from Union Camp. When equal parts of the Eastman AQ 1950 and the Unirez 2638 were blended, no phase separation occurred when held overnight at 325° F., but the texture became slightly grainy. The viscosity at 325° F. was 8875 cps.

Example XV

This example demonstrates construction adhesives prepared by combining sulfonated polyesters with a crystalline polyester (Dynapol S1402). These adhesives resist water of high ionic strength, but disperse rapidly in tap water.

TABLE 16

| | 54 | 55 | 56 |
| --- | --- | --- | --- |
| Dynapol S1402 | 10 | 10 | 10 |
| AQ1950 | 70 | 60 | 65 |
| Benzoflex 2-45 | 10 | — | — |
| Dynacoll 7130 | — | 10 | 5 |
| RX13557 Polyester Plasticizer | 10 | 20 | 20 |
| Visc (cP) | | | |
| 275° F. | 19,960 | 64,000 | 19,200 |
| 325° F. | 7,100 Somewhat gummy | 17,400 V. tough | 7,250 Somewhat gummy |

Both samples 54 and 55 dispersed rapidly in room temperature water and were only minimally affected by the addition of 0.9% NaCl used to simulate urine. (Sample 56 was not tested for dispersibility.)

We claim:

1. A hot melt adhesive composition comprising (i) 10 to 90% by weight of a sulfonated polyester; condensation polymer comprising the reaction product of a) at least one difunctional dicarboxylic acid or the corresponding methyl esters which is not a sulphomonomer;

b) 2 to 25 mole percent of at least one sulfomonomer containing at least one metallic sulfonate group or nitrogen-containing non-metallic sulfonate group attached to an aromatic or cycloaliphatic nucleus and at least one functional group selected from the group consisting of hydroxyl, carboxyl, and amino;

c) at least one difunctional reactant selected from a glycol or a mixture of a glycol and diamine having two —NRH groups, the glycol containing two —C($R^1$), —OH groups wherein R in the reactant is hydrogen or an alkyl group of 1 to 6 carbon atoms, and $R^1$ in the reactant is a hydrogen atom, en alkyl of 1 to 5 carbon atoms, or an aryl group of 6 to 10 carbons atoms:

d) 0 to 40 mole percent of a difunctional reactant selected from hydroxycarboxylic acids having one —C(R)$_2$—OH group, aminocarboxylic acids having one —NRH group, amino-alcohols having one —C(R)$_2$—OH group and one —NRH group, or mixtures of said difunctional reactants wherein R in the reactant is hydrogen or an alkyl group of 1 to 6 carbon atoms; and e) 0 to 40 mole percent of a multifunctional reactant containing at least three functional groups selected from hydroxyl, carboxyl, and mixtures thereof wherein at least a portion of the multifunctional reactant contains at least three hydroxyl groups, wherein all stated mole percentages are based on the total of all acid, hydroxyl and amino group containing reactants being equal to 200 mole percent, and wherein the polymer contains proportions of acid-group containing reactants (100 mole percent acid) to hydroxy- and amino-group containing reactants (100 mole percent base) such that the value of the equivalents of base divided by the equivalents of acid is between 0.5 and 2;

(ii) 0 to 80% by weight of a compatible tackifier;

(iii) 0 to 40% by weight of a compatible plasticizer;

(iv) at least one crystalline material selected from the group consisting of:

(I) 5 to 40% by weight of a compatible wax diluent, with a molecular weight below 500 g/mole containing at least one polar functional group, said group being present at a concentration greater than $3 \times 10^{-3}$ equivalents per gram and (II) 0 to 60% by weight of a crystalline thermoplastic polymer; and (v) 0 to 3% by weight of a stabilizer;

the total of (i)–(v) to equal 100% by weight.

2. The hot melt adhesive of claim 1 wherein the difunctional acid or ester reactant of (a) of the sulfonated polyester is an acid selected from the group consisting of oxalic; malonic; maleic; furmaric; pivalic; dodecanoic; dimethylmalonic; succinic; glutaric; adipic; trimethyladipic; pimelic; 2,2-dimethylglutaric; azelaic; sebacic; 1,3-cyclopentanedicarboxylic; 1,2-cyclohexanedicarboxylic; 1,3-cyclohexane dicarboxylic; 1,4-cyclo-hexanedicarboxylic; phthalic; terephthalic; isophthalic; 2,5-norbornanedicarboxylic; 1,3-naphthalic; diphenic; 4,4'-oxydibenzoic; diglycolic; thiodipropionic; 4,4'-sulfonyldibenzoic; and 2,5-naphthalenedicarboxylic acids and esters thereof and mixtures thereof.

3. The hot melt adhesive of claim 2 wherein the difunctional dicarboxylic acid or ester reactant of (a) is selected from the group of acids consisting of isophthalic acid, terephthalic acid, phthalic anhydride (acid), adipic acid, pivalic acid, dodecanedioic acid, sebacic acid, azelaic acid, 1,4-cyclohexanedicarboxylic acid, 1,3-cyclohexanedicarboxylic acid, maleic anhydride, fumaric acid, succinic anhydride (acid), 2,6-naphthalenedicarboxylic acid, and glutaric acid and esters thereof and mixtures thereof.

4. The hot melt adhesive of claim 3 wherein the difunctional dicarboxylic acid reactant is selected from the group consisting of isophthalic acid, adipic acid, 1,4-cyclohexanedicarboxylic acid, 1,3-cyclohexanedicarboxylic acid and mixtures thereof.

5. The hot melt adhesive of claim 1 wherein the sulfomonomer reactant of (b) of the sulfonated polyester is selected from the group consisting of difunctional monomers containing a —SO$_3$M group attached to a nucleus selected from the group consisting of benzene, naphthalene, anthracene, diphenyl, oxydiphenyl, sulfonyldiphenyl, and methylenediphenyl, wherein M is Na+, Li+, Mg++, Ca++, Fe++, and Fe+++.

6. The hot melt adhesive of claim 5 wherein the sulfomonomer reactant is selected from the group consisting of diols and diol adducts of multifunctional reactant containing at least three hydroxyl groups and a monocarboxylic acid sulfomonomer containing at least one metallic sulfonate group or nitrogen-containing non-metallic sulfonate group attached to an aromatic or cyclo-aliphatic nucleus.

7. The hot melt adhesive of claim 5 wherein the sulfomonomer is selected for the group consisting of 5-sodiosulfoisophthalic acid, dimethyl 5-sodiosulfoisophthalate, 5-lithiosulfoisphthalic acid, and bis(2-hydroxyethyl)-5-sodiosulfoisophthalate.

8. The hot melt adhesive of claim 1 wherein the difunctional reactant of (c) is a diol selected from the group consisting of ethylene glycol; propylene glycol; 1,3-propanediol; 2-methyl-1,3-propanediol; 2,4-dimethyl-2-ethyl-hexane-1,3-diol; 2,2-dimethyl-1,3-propanediol; 2-ethyl-2-butyl-1,3-propanediol; 2-ethyl-2-butyl-1,3-propanediol;2-ethyl-2-isobutyl-1,3-propanediol;1,3-butanediol;1,4-butanediol; 1,5-pentanediol; 1,6-hexanediol; 2,2,4-trimethyl-1,6-hexanediol; thiodiethanol; 1,2-cyclohexanedimethanol;1,3-cyclohexanedimethanol;1,4-cyclohexanedimethanol;2,2,4,4-tetramethyl 1,3-cyclobutanediol; p-xylylenediol; diethylene glycol; triethylene glycol; tetraethylene glycol; pentaethylene glycol; hexaethylene glycol; heptaethylene glycol; octaethylene glycol; nonaethylene glycol; decaethylene glycols; 2,2,4-trimethyl-1-1,3-pentanediol; hydroxypivalyl hydroxypivalate; dipropylene glycol; 1,10-decanediol; hydrogenated bisphenol A; and mixtures thereof.

9. The hot melt adhesive of claim 8 wherein the difunctional reactant is selected from the group consisting of diethylene glycol; triethyleneglycol; neopentyl glycol, cyclohexanedimethanol, 2-ethyl-2-butyl-1,3-propanediol, 2,2,4-trimethyl-1,3-pentanediol, hydroxypivalyl hydroxypivalate, and 2-methyl-1,3-propanediol.

10. The hot melt adhesive of claim 1 wherein the difunctional monomer components of (d) of the sulfonated polyester is an aminocarboxylic acids selected from the group consisting of 6-aminocaproic acid, its lactam known as caprolactam, omega-aminoundecanoic acid, 3-amino-2-dimethyiproplonic acid, 4-(β-aminoethyl)-benzoic acid, 2-(β-aminopropoxy) benzoic acid, 4-aminomethlcyclohexanecarboxylic acid, and 2-(β-aminopropoxy) cyclohexanecarboxylic acid.

11. The hot melt adhesive of claim 1 wherein the difunctional monomer of (c) of the sulfonated polyester is a diamine selected from the group consisting of ethylenediamine; hexamethyienediamine; 2,2,4-trimethylhexamethylenediamine; 4-oxaheptane-1,7-diamine; 4,7-dioxadecane-1,10-diamine; 1,4-cyclohexanebismethylamine; 1,3-cycloheptamethylenediamine; and dodecamethylenediamine.

12. The hot melt adhesive of claim 1 wherein the multifunctional reactant of the sulfonated polyester is selected from this group consisting of trimethylolpropane, trimethylolethane, glycerine, pentaerythritol, arytritol, threitol, dipentaerythritol, sorbitol, trimellitic anhydride, pyromellitic dianhydride, and dimethylolpropionic acid.

13. The hot melt adhesive of claim 1 wherein the sulfonated polyester comprises 60 to 100 mole percent of (a), 4 to 20 mole percent of (b), 80 to 100 mole percent of (c), 0 to 10 mole percent of (d), and 0 to 20 mole percent of (e).

14. The hot melt adhesive of claim 1 wherein the tackifying resin is a polar resin having a Ring and Ball softening point greater than 60° C. and selected from the group consisting of (1) natural and modified rosins; (2) sucrose benzoate; (3) phenolic modified terpene and α-methyl styrene resins and hydrogenated derivatives thereof; and (4) rosin esters.

15. The hot melt adhesive of claim 1 additionally containing up to 20 percent by weight of non-polar tackifier.

16. The hot melt adhesive of claim 1 wherein this tackifier is sucrose benzoate.

17. The hot melt adhesive of claim 1 wherein the compatible plasticizer is a polar plasticizer selected from the group consisting of phthalate plasticizers, benzoate plasticizers, aliphatic liquid polyesters, phosphate plasticizers, poly(ethylene glycol) with number average molecular weight below about 1000; ethoxylates of phenol, bisphenol A or mono or di- alkylated phenol, liquid rosin derivatives having Ring and Ball melting points below about 60° C., and vegetable and animal oils.

18. The hot melt adhesive of claim 17 wherein the plasticizer is selected from the group consisting of the mono-phenyl ether of polyethylene-glycol; butyl benzyl phthalate; diethylene glycol/dipropylene glycol dibenzoate, and diethylene glycol dibenzoate where the mole fraction of hydroxyl groups which have been esterified ranges from 0.5 to 0.95.

19. The hot melt adhesive of claim 17 wherein there is additionally present up to 10% by weight of non-polar plasticizing diluents.

20. The hot melt adhesive of claim 1 wherein the crystalline polar wax diluent is selected from the group consisting of 12-hydroxystearamide wax, N-(2-hydroxy ethyl) 12-hydroxystearamide and stearamide.

21. The hot melt adhesive of claim 21 additionally containing present up to 10% by weight a less polar wax selected from the group consisting of N,N'-ethylene-bis-stearamide, hydrogenated castor oil, oxidized synthetic waxes, and functionalized synthetic wax.

22. The hot melt adhesive of claim 1 where the crystalline thermoplastic polymer is selected from the group consisting of ethylene vinyl acetate copolymers containing about 12 to 50% vinyl acetate, ethylene acrylic acid, ethylene methyl acrylate, ethylene n-butyl acrylate copolymers, polylactide and caprolactone polymers, poly(hydroxy-butyrate/hydroxyvalerate), polyvinyl alcohol, poly(ethylene oxide), saturated polyesters, polyether amide and polyether ester block copolymers.

23. The hot melt adhesive of claim 1 additionally containing up to 20% by weight of an elastomeric polymer selected from the group consisting of styrene-isoprene-styrene, epoxidized polyisoprene, styrene-butadiene-styrene, styrene-ethylene butylene-styrene, and styrene-ethylene propylene styrene.

24. The hot melt adhesive of claim 1 additionally containing of up to 20% by weight of a hydrophilic polymer selected from the group consisting of hydroxyethyl cellulose, hydroxypropyl cellulose, polyvinyl methyl ether, polyvinylpyrrolidone, polyethyloxazoline, starch and cellulose esters.

25. A non-pressure sensitive adhesive composition comprising (i) 10 to 90% by weight of a sulfonated polyester; condensation polymer comprising the reaction product of
   a) at least one difunctional dicarboxylic acid or the corresponding methyl ester which is not a sulphomonomer;
   b) 2 to 25 mole percent of at least one sulfomonomer containing at least one metallic sulfonate group or nitrogen-containing non-metallic sulfonate group attached to an aromatic or cycloaliphatic nucleus and at least one functional group selected from the group consisting of hydroxyl, carboxyl, and amino;
   c) at least one difunctional reactant selected from a glycol or a mixture of a glycol and diamine having two —NRH groups, the glycol containing two —C($R^1$)$_2$—OH groups wherein R in the reactant is hydrogen or an alkyl group of 1 to 6 carbon atoms, and $R^1$ in the reactant is a hydrogen atom, an alkyl of 1 to 5 carbon atoms, or an aryl group of 6 to 10 carbons atoms;
   d) 0 to 40 mole percent of a difunctional reactant selected from hydroxycarboxylic acids having one —C(R)$_2$—OH group, aminocarboxylic acids having one —NRH group, amino-alcohols having one —C(R)$_2$—OH group and one —NRH group, or mixtures of said difunctional reactants wherein R in the reactant is hydrogen or an alkyl group of 1 to 6 carbon atoms; and
   e) 0 to 40 mole percent of a multifunctional reactant containing at least three functional groups selected from hydroxyl, carboxyl, and mixtures thereof wherein at least a portion of the multifunctional reactant contains at least three hydroxyl groups, wherein all stated mole percentages are based on the total of all acid, hydroxyl and amino group containing reactants being equal to 200 mole percent, and wherein the polymer contains proportions of acid-group containing reactants (100 mole percent acid) to hydroxy- and amino-group containing reactants (100 mole percent base) such that the value of equivalents of base divided by equivalents of acid is between 0.5 and 2; (ii) 0 to 80% of a compatible tackifying resin; (iii) 5 to 40% of a compatible crystalline wax diluent with a molecular weight below 500 g/mole containing at least one polar functional group, the group being present at a concentration greater than $3 \times 10^{-3}$ equivalents per gram; (iv) 0 to 40% of a compatible plasticizer and (v) 0 to 3% of a stabilizer.

26. A non-pressure sensitive adhesive composition consisting essentially of (i) 10 to 90% by weight of a sulfonated polyester; condensation polymer comprising the reaction product of
   a) at least one difunctional dicarboxylic acid or the corresponding methyl ester which is not a sulphomonomer;
   b) 2 to 25 mole percent of at least one sulfomonomer containing at least one metallic sulfonate group or nitrogen-containing non-metallic sulfonate group attached to an aromatic or cycloaliphatic nucleus and at least one functional group selected from the group consisting of hydroxyl, carboxyl, and amino;
   c) at least one difunctional reactant selected from a glycol or a mixture of a glycol and diamine having two —NRH groups, the glycol containing two —C($R^1$)$_2$—OH groups wherein R in the reactant is hydrogen or an alkyl group of 1 to 6 carbon atoms, and $R^1$ in the reactant is a hydrogen atom, an alkyl of 1 to 5 carbon atoms, or an aryl group of 6 to 10 carbons atoms;
   d) 0 to 40 mole percent of a difunctional reactant selected from hydroxycarboxylic acids having one —C(R)$_2$—OH group, aminocarboxylic acids having one —NRH group, amino-alcohols having one —C(R)$_2$—OH group and one —NRH group, or mixtures of said difunctional reactants wherein R in the reactant is hydrogen or an alkyl group of 1 to 6 carbon atoms; and
   e) 0 to 40 mole percent of a multifunctional reactant containing at least three functional groups selected from hydroxyl, carboxyl, and mixtures thereof wherein at least a portion of the multifunctional reactant contains at least three hydroxyl groups, wherein all stated mole percentages are based on the total of all acid, hydroxyl and amino group containing reactants being equal to 200 mole percent, and wherein the polymer contains proportions of acid-group containing reactants (100 mole percent acid) to hydroxy- and amino-group containing reactants (100 mole percent base) such that the value of equivalents of base divided by equivalents of acid is between 0.5 and 2; (ii) 0 to 80% of a compatible tackifying resin; (iii) 5 to 40% of a compatible crystalline wax diluent with a molecular weight below 500 g/mole containing at least one polar functional group, the group being present at a concentration greater than $3 \times 10^{-3}$ equivalents per gram; (iv) 0 to 40% of a compatible plasticizer and (v) 5 to 60% by weight of a compatible crystalline thermoplastic polymer selected from the group consisting of ethylene vinyl acetate copolymers containing about 12 to 50% vinyl acetate, ethylene acrylic acid, ethylene methyl acrylate, ethylene n-butyl acrylate copolymers, polylactide and caprolactone polymers, poly(hydroxybutyrate/hydroxyvalerate), polyvinyl alcohol, poly(ethylene oxide), saturated polyesters, polyether amide and polyether ester block copolymers; and (vi) 0 to 3% by weight of a stabilizer, the total of (i)–(vi) to equal 100% by weight.

27. The hot melt adhesive of claim 26 additionally containing up to 20% by weight of an elastomeric polymer selected from the group consisting of styrene-isoprene-styrene, epoxidized polyisoprene, styrene-butadiene-styrene, styrene-ethylene butylene-styrene, and styrene-ethylene propylene styrene.

28. The hot melt adhesive of claim 26 additionally containing of up to 20% by weight of a hydrophilic polymer selected from the group consisting of hydroxyethyl cellulose, hydroxypropyl cellulose, polyvinyl methyl ether, polyvinylpyrrolidone, polyethyloxazoline, starch and cellulose esters.

* * * * *